United States Patent [19]
Tanaka et al.

[11] Patent Number: 5,729,291
[45] Date of Patent: Mar. 17, 1998

[54] VIDEO CAMERA WITH COMPACT ARRANGEMENT OF PARTS

[75] Inventors: Chifuyu Tanaka, Tokyo; Kenichi Nagasawa; Takeshi Abe, both of Kanagawa-ken, all of Japan

[73] Assignee: Canon Kabushiki Kaisha, Tokyo, Japan

[21] Appl. No.: 324,539

[22] Filed: Oct. 18, 1994

Related U.S. Application Data

[63] Continuation of Ser. No. 894,242, Jun. 8, 1992.

[30] Foreign Application Priority Data

Jun. 18, 1991 [JP] Japan ........................ 3-145993
Jul. 11, 1991 [JP] Japan ........................ 3-171289

[51] Int. Cl.⁶ .................. H04N 5/225; H04N 5/222
[52] U.S. Cl. .................. 348/373; 348/333; 348/376; 358/906; 396/321; 396/374
[58] Field of Search .................. 348/207, 231, 348/233, 335, 340, 341, 373, 374, 375, 376, 333, 232; 354/219; 359/676, 694, 695, 696; 386/38, 117, 118; 396/321, 374; H04N 5/225

[56] References Cited

U.S. PATENT DOCUMENTS

| | | | |
|---|---|---|---|
| 3,940,777 | 2/1976 | Komine | 354/197 |
| 4,404,595 | 9/1983 | Ushiro et al. | 358/227 |
| 4,499,504 | 2/1985 | Edakubo et al. | 358/335 |
| 4,584,613 | 4/1986 | Amari et al. | 358/310 |
| 4,652,930 | 3/1987 | Crawford | 358/227 |
| 4,769,711 | 9/1988 | Date | 358/229 |
| 4,986,618 | 1/1991 | Wakatsuki | 312/276 |
| 5,038,213 | 8/1991 | Yoda | 358/209 |
| 5,132,800 | 7/1992 | Wada et al. | 358/209 |
| 5,221,964 | 6/1993 | Chamberlain | 358/229 |
| 5,294,988 | 3/1994 | Wakabayashi et al. | 348/373 |
| 5,442,453 | 8/1995 | Takagi et al. | 358/335 |
| 5,469,271 | 11/1995 | Hoshino et al. | 358/335 |
| 5,515,174 | 5/1996 | Abe et al. | 358/335 |

FOREIGN PATENT DOCUMENTS

| | | | |
|---|---|---|---|
| 0270235 | 5/1990 | European Pat. Off. | H04N 5/92 |
| 213071 | 1/1990 | Japan | H04N 5/225 |
| 0250569 | 10/1990 | Japan | H04N 5/30 |
| 0001767 | 1/1991 | Japan | H04N 5/225 |
| 4130869 | 5/1992 | Japan | H04N 5/225 |
| 4-196773 | 7/1992 | Japan | H04N 5/225 |
| 2083314 | 10/1984 | United Kingdom | H04N 5/78 |

*Primary Examiner*—Andrew Faile
*Assistant Examiner*—Ngoc-Yen Vu
*Attorney, Agent, or Firm*—Robin, Blecker, Daley and Driscoll

[57] ABSTRACT

A photographic optical system and a viewfinder are disposed above a recorder casing for recording a signal obtained by photography. The photographic optical system and the viewfinder are disposed so as not to overlap each other in a direction parallel to an optical axis of the photographic optical system and so that an optical path of the photographic optical system and an optical path of the viewfinder overlap each other as viewed on an extended line of the optical axis of the photographic optical system. In addition, the photographic optical system is disposed above the recorder casing, and the recorder casing is arranged to eject downward a recording medium for recording of a signal obtained by photography. A grip is disposed on one side of the aforesaid recorder casing, and an operating part for driving a mechanism for varying the magnification of the photographic optical system is provided at the rear of the photographic optical system.

9 Claims, 8 Drawing Sheets

5,729,291

VIDEO CAMERA WITH COMPACT ARRANGEMENT OF PARTS

This is a continuation application under 37 CFR 1.62 of prior application Ser. No. 07/894,242, filed Jun. 8, 1992, now pending.

BACKGROUND OF THE INVENTION

1. Field of the Invention

The present invention relates to a video camera and, more particularly, to a video camera provided with a recorder for recording a signal obtained by photography.

2. Description of the Related Art

A camera-integrated type video tape recorder (VTR) is known as one example of a video camera provided with such a recorder. In recent years, such a camera-integrated type VTR has been being reduced in size and weight to a remarkable extent, so that this kind of apparatus has become more and more popular.

As is known to those skilled in the art of this kind of video camera, the easiness with which such a camera-integrated type VTR is handled is determined by how to dispose a photographic optical system of a camera part or an electronic viewfinder (EVF) in relation to the mechanism of a VTR part (recorder part).

In a typical conventional arrangement, the photographic optical system is disposed on the front face of a VTR casing, while the EVF is disposed on the top face of the VTR casing. This arrangement can be considered very superior in that since the EVF is positioned on the top of the VTR casing, an operator can look into the EVF during photography without the need to raise the VTR casing up to a high position.

A camera-integrated type VTR which has recently been provided as a manufactured product adopts an arrangement in which the photographic optical system and the EVF are disposed on one side of the recorder casing.

This kind of camera-integrated type VTR can be considered superior in that the entire apparatus can be made extremely compact.

However, the former arrangement is not preferable in terms of the pursuit of the compactness of the camera-integrated type VTR. In this arrangement, since the photographic optical system is disposed to project from the front face of the VTR casing, the entire length of the camera-integrated type VTR is greater than the length of the VTR casing by the projecting length of the photographic optical system.

According to the latter arrangement, it is possible to realize a compact camera-integrated type VTR which has an extremely small size as viewed from either side thereof. However, since the photographic optical system and the EVF are disposed side by side in the lateral direction relative to the VTR casing, the entire thickness of the apparatus increases. If this arrangement is adapted to a portable camera-integrated type VTR which is often carried in a bag, the portability itself will be impaired because of the thickness. For example, if a camera-integrated type VTR having such thickness is to be accommodated in a suitcase, a suitcase having a sufficient width must be employed.

This kind of camera-integrated type VTR is designed in such a manner that the photographic optical system and the EVF are disposed on one side. If a grip is to be provided on the opposite side, various operating keys must be disposed on the top or rear face of the apparatus. As a result, not only is the freedom of arrangement of the operating keys limited but also there is no sufficient room to dispose them. The grip may be provided on the photographic optical system or the EVF. However, this arrangement has the disadvantages that the sensation of grip holding is impaired and that the center of balance of the camera-integrated type VTR is away from a holding position. A user will have to perform photography while bearing the burden of supporting the weight of the camera-integrated type VTR which is biased from the center of balance.

The reductions in the size and weight of the conventional camera-integrated type VTR are only intended for a reduction in the size of the external appearance and a mere reduction in the weight of the entire apparatus. In other words, the reductions in the size and weight of the conventional camera-integrated type VTR do not take account of elimination of disturbances such as the influence of noise on a microphone used with a video camera and the influence of heat on an image sensor in the video camera.

SUMMARY OF THE INVENTION

It is, therefore, an object of the present invention to solve the above-described problems.

Another object of the present invention is to provide a video camera having an arrangement which satisfies conditions such as compactness, thinness and operability.

To achieve the above-described objects, according to one aspect of the present invention, there is provided an arrangement in which a photographic optical system and a viewfinder are disposed above a recorder casing for recording a signal obtained by photography.

In addition, the photographic optical system and the viewfinder are disposed so as not to overlap each other in a direction parallel to the optical axis of the photographic optical system and so that the optical path of the photographic optical system and the optical path of the viewfinder overlap each other as viewed on an extended line of the optical axis of the photographic optical system.

According to another aspect of the present invention, there is provided an arrangement in which a photographic optical system is disposed between sound inputting means for inputting sound information and a driving part for controlling the position of a lens in the photographic optical system.

In addition, the aforesaid arrangement also includes a recorder mechanism part, and the photographic optical system is disposed above the recorder mechanism part and the driving part is disposed above the photographic optical system.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

Figure 1:
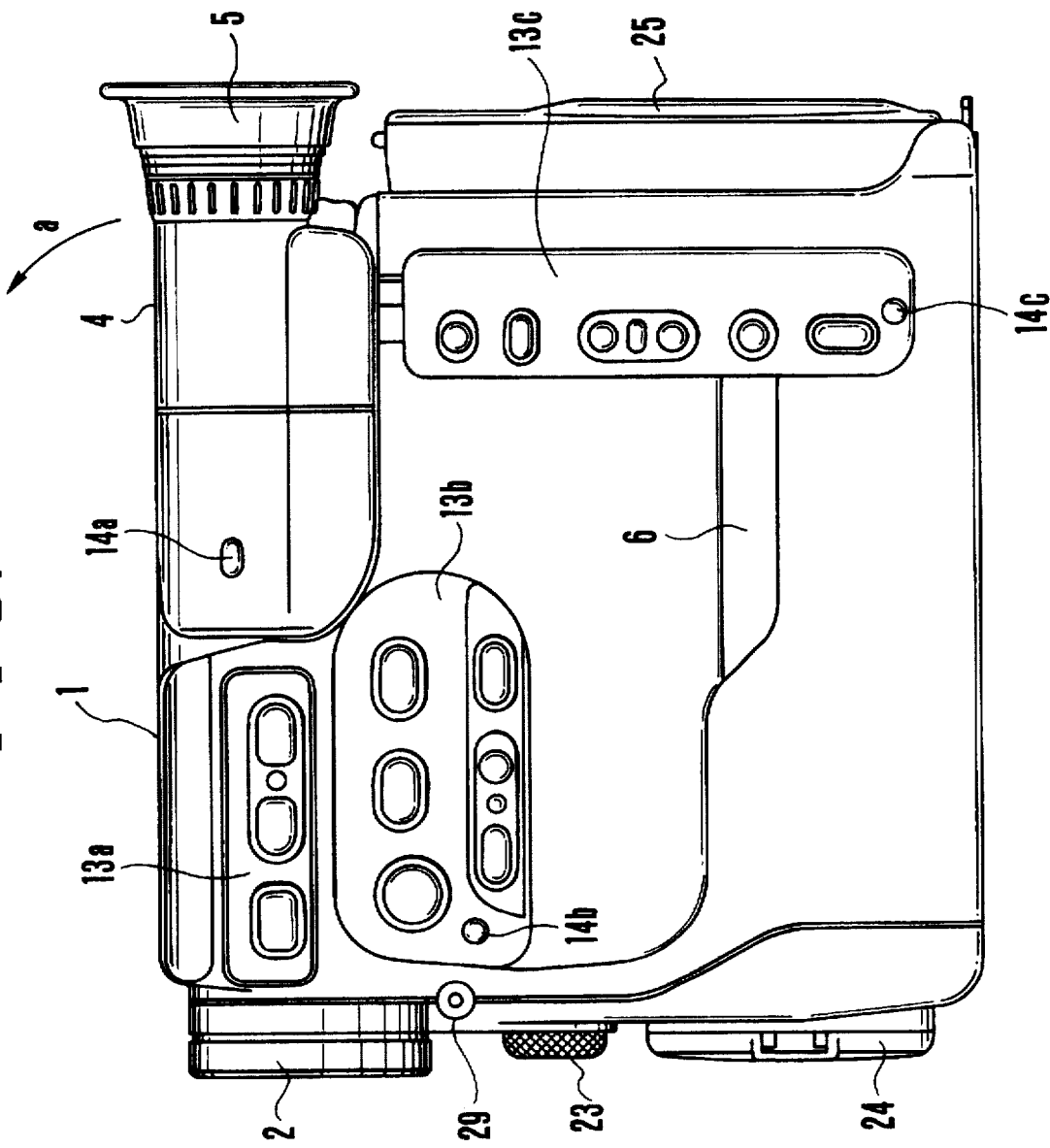
FIG. 1 is a right side view diagrammatically showing the structure of a camera-integrated type VTR according to an embodiment of the present invention.

A preferred embodiment of the present invention will be described below in detail with reference to the accompanying drawings.

FIGS. 1 to 5 are diagrammatic views showing the structure of a camera-integrated type VTR according to the embodiment of the present invention. FIGS. 1 to 5 are a right side view, a front elevational view, a top side view, a left side view and a perspective view, respectively, and throughout the figures, the same reference numerals are used to denote common constituent elements.

Referring to FIG. 1, an optical-system accommodating part 1 accommodates a photographic optical system which contains a number of lens elements aligned behind a lens opening portion 2. The photographic optical system in the present embodiment employs a so-called rear focusing lens unit, i.e., a lens unit arranged not to move a lens element nearest to a subject when the focal length is to be varied or when focus adjustment is to be performed. As is well known, such a rear focusing lens unit has the advantage that the length along the optical axis can be reduced, although the position of a driven lens needs to be controlled in a complicated way. Since the details of the rear focusing lens unit are known, detailed description is omitted herein.

Figure 3:
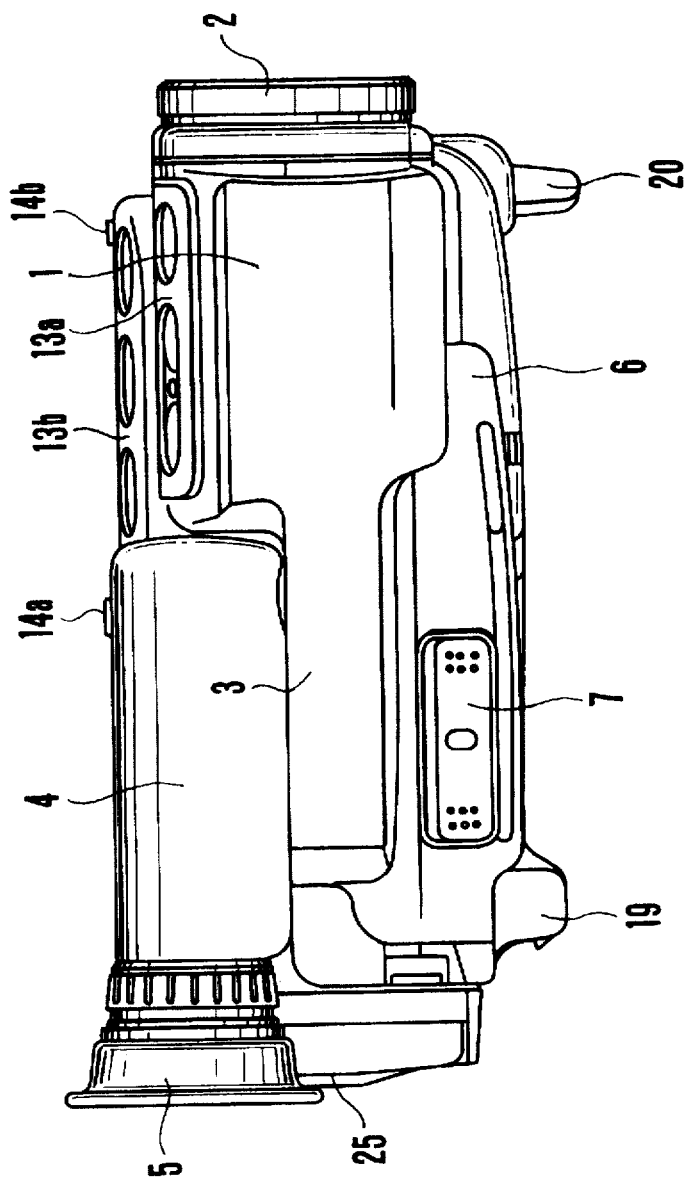
FIG. 3 is a top side view diagrammatically showing the structure of the camera-integrated type VTR according to the embodiment of the present invention.

The optical-system accommodating part 1 is disposed on a subject side of the body of the camera-integrated type VTR, as shown in FIG. 1, and has a cylindrical portion, such as that shown in FIG. 3, in which the aforesaid lens unit is accommodated. An elongate portion 3 is formed integrally with the cylindrical portion, and a supporting portion (not shown) for turnably supporting an EVF unit 4 is provided on the right side face of the elongate portion 3 in such a manner that the EVF unit 4 is turnable about a portion thereof nearer to the optical-system accommodating part 1. More specifically, an eyepiece part 5 of the EVF unit 4 can be moved in the direction indicated by the arrow a of FIG. 1, thereby facilitating so-called low-angle photography.

The EVF unit 4 includes a small monitor, such as a CRT or a liquid-crystal display, and an optical system for conducting a picture displayed on the small monitor into the eyepiece part 5. During the state of normal photography shown in FIG. 1, the optical system within the EVF unit 4 and the photographic optical system are disposed so that their optical paths overlap each other as viewed from a point on an extended line of the optical axis of the photographic optical system, that is to say, both optical paths are positioned in overlapping relation to each other as viewed from the front side of the body. In such an arrangement, not only is it possible to effectively utilize space on the top of a VTR casing 6 but also it is possible to reduce parallax to an extremely small extent since the optical path of the optical system in the EVF unit 4 and the optical path of the photographic optical system are positioned extremely close to each other. As will be described later, since the EVF unit 4 is provided on the top of the VTR casing 6, if an operator holds the camera-integrated type VTR with the eye applied to the eyepiece part 5, the operator can perform photography with the arm which is holding it kept closed. Accordingly, the operator can hold the VTR body securely and stably during photography.

The VTR casing 6 includes mechanisms such as a rotary head drum and a cassette accommodating/holding part, an electrical circuit, and others. As is apparent from FIGS. 1 to 5, in the present embodiment, the optical-system accommodating part 1 and the EVF unit 4 are disposed on the top of the VTR casing 6 so that the thickness of the entire camera-integrated type VTR can be reduced to the required minimum thickness of the VTR casing 6.

A zoom switch 7 for varying the focal length is disposed on the left side face of the elongate portion 3 so as to effectively utilize space on the top of the VTR casing 6. More specifically, as will be described later, the camera-integrated type VTR according to the present embodiment is designed in such a manner that the operator can hold the left side face of the VTR casing 6, and it is, therefore, preferable to dispose the zoom switch 7 at a position which the fingers of the operator can reach with the left side face held. For this reason, the zoom switch 7 is disposed within space which is defined on the rear side of the optical-system accommodating part 1 by reducing the axial length thereof. The disposition of the zoom switch 7 at that position realizes the effective use of the space. In the present embodiment, the optical-system accommodating part 1 and the VTR casing 6 are integrally formed.

Figure 2:
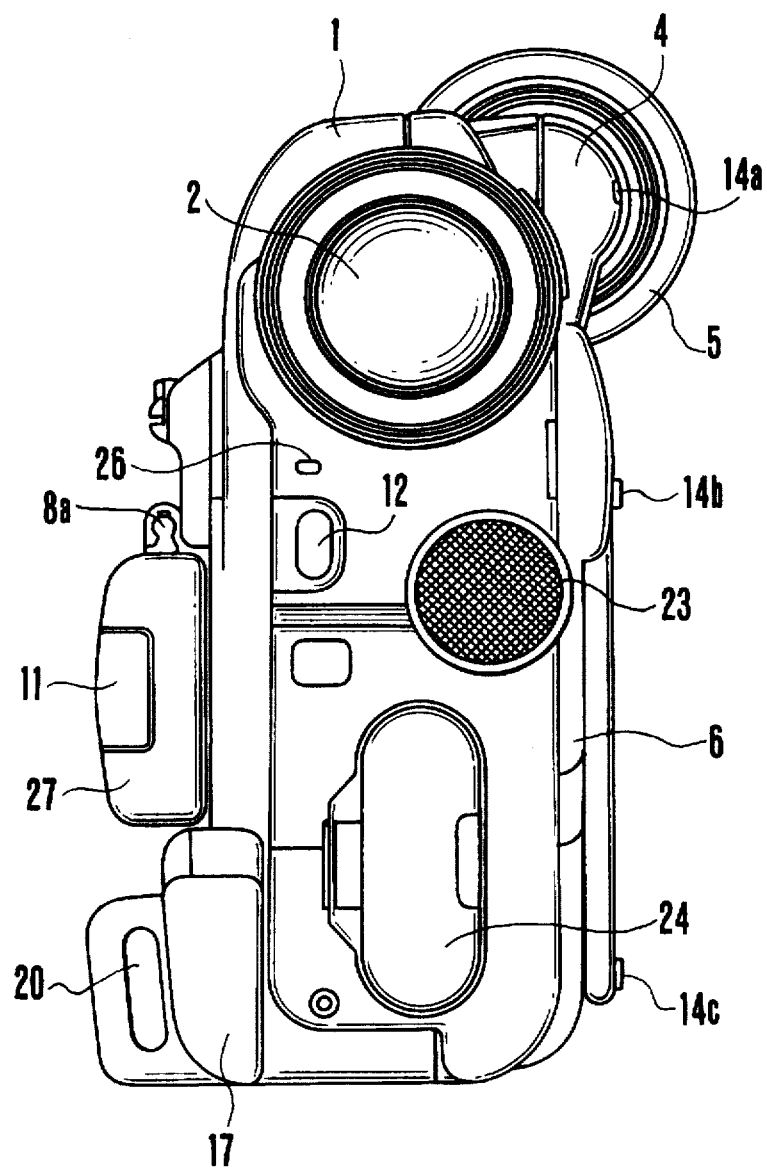
FIG. 2 is a front elevational view diagrammatically showing the structure of the camera-integrated type VTR according to the embodiment of the present invention.
Figure 4:
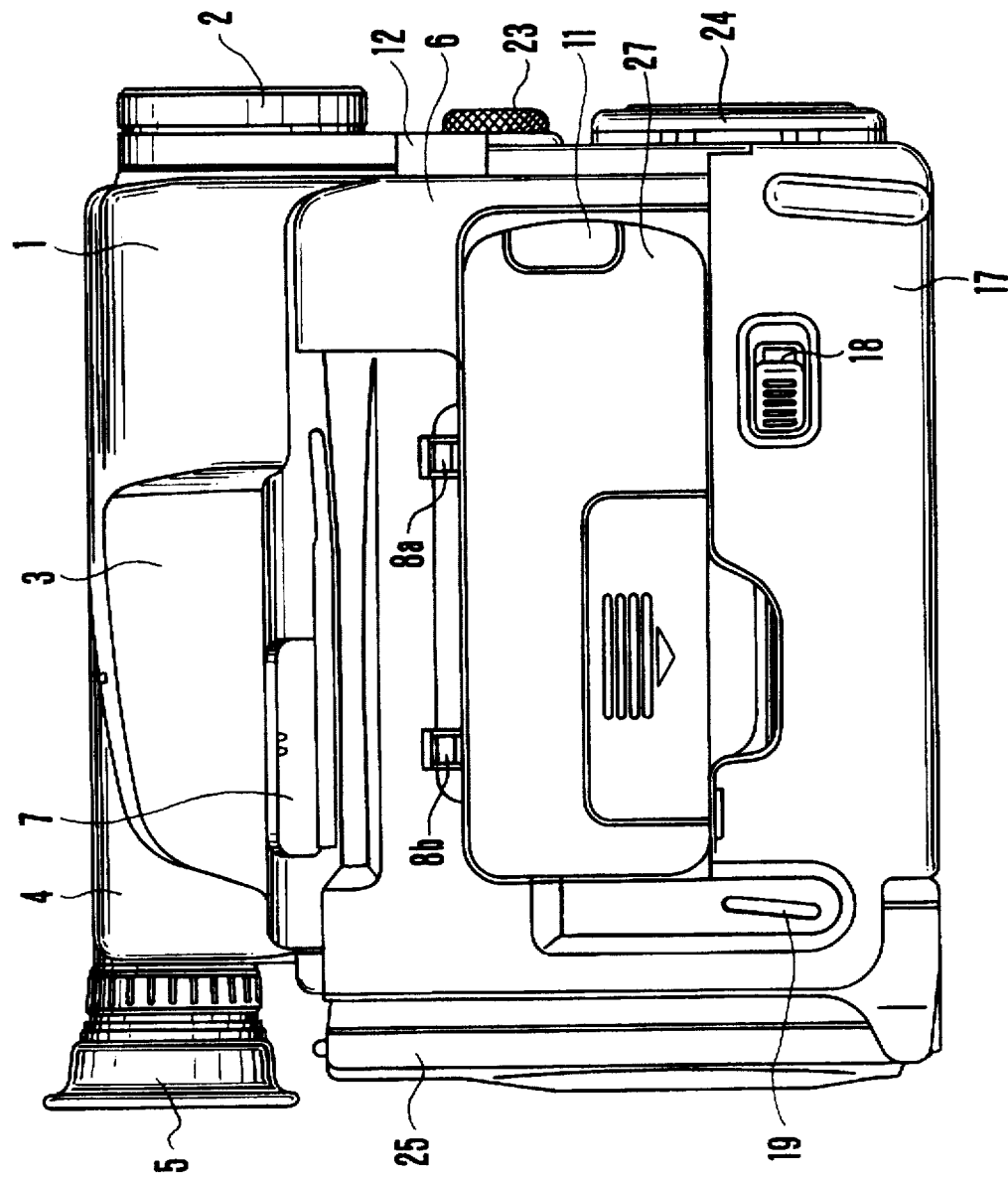
FIG. 4 is a left side view diagrammatically showing the structure of the camera-integrated type VTR according to the embodiment of the present invention.
Figure 5:
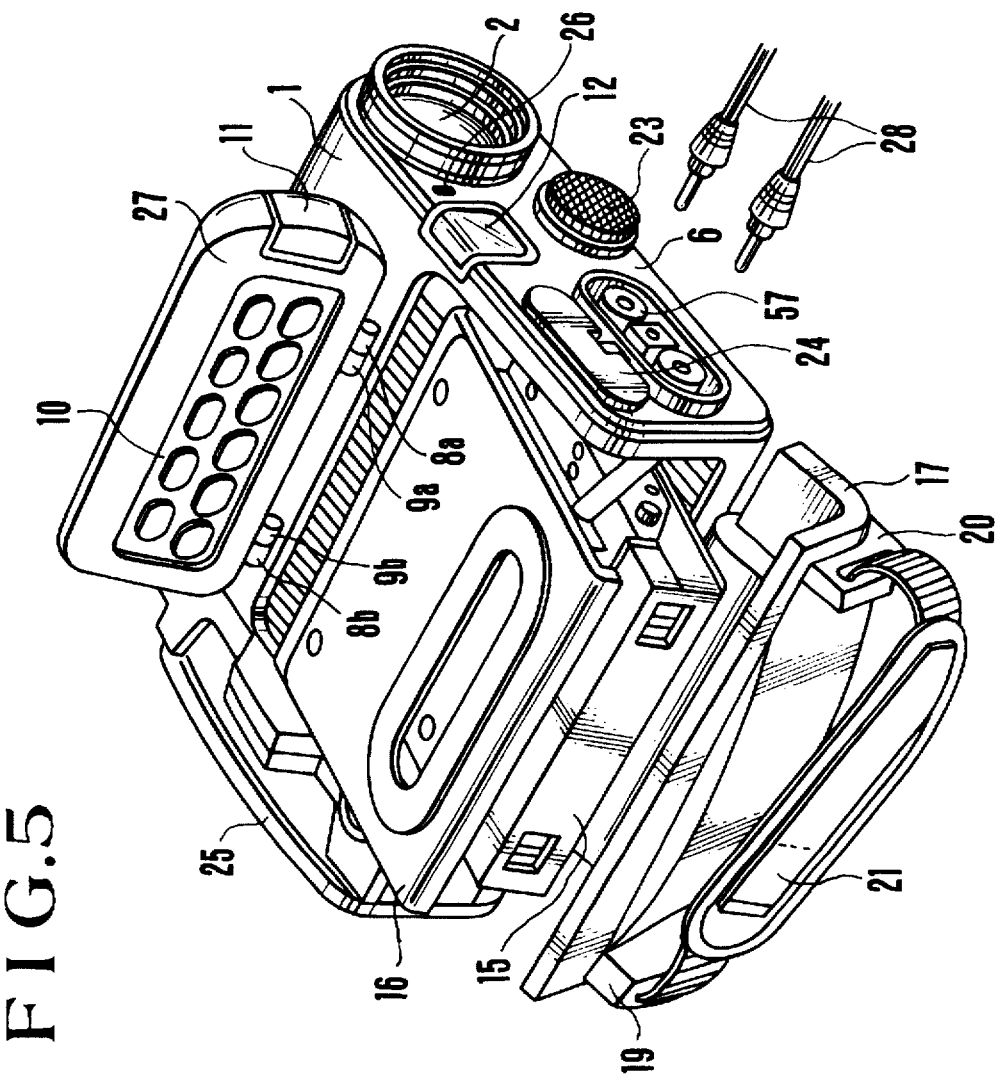
FIG. 5 is a perspective view diagrammatically showing the structure of the camera-integrated type VTR according to the embodiment of the present invention.

A remote controller 27 also serves to constitute part of a grip which aids the operator in holding the camera-integrated type VTR, as will be described later. As shown in FIGS. 2, 4 and 5, the remote controller 27 is disposed on the left side face of the VTR casing 6. The remote controller 27 has engagement portions 8a and 8b, and is secured to engagement portions 9a and 9b provided on the left side face of the VTR casing 6 by means of the respective engagement portions 8a and 8b. The remote controller 27 is arranged for turning motion through approximately 120° about an axis defined by the engagement portions 8a and 8b.

The remote controller 27 has an operating portion 10 disposed on a reverse side thereof as shown in FIG. 5. The operator can cause the camera-integrated type VTR to perform all kinds of operations associated with reproduction, while operating the operating portion 10, for example, to perform normal reproduction, special reproduction, tape fast forward feed, stop, cueing search, or sound switching, by operating a corresponding one of the operating keys disposed in the operating portion 10. Of course, it is also possible to cause the camera-integrated type VTR to perform an operation for photography, such as start/stop of recording, variation of the focal length, insertion of a date or a title, or fading.

The front portion of the remote controller 27 is provided with an infrared-light emitting part 11 for outputting infrared light indicative of information about the operation of each operating key disposed in the operating portion 10. Infrared light emitted from the infrared-light emitting part 11 is received by an infrared-light receiving part 12 provided on the front left side of the VTR casing 6, and the received infrared light is conducted to the system controller of the apparatus body.

During photography, the remote controller 27 is attached with the operating portion 10 hidden as shown in FIG. 2, and functions as part of the grip. If only the VTR part of the apparatus is to be operated, the remote controller 27 is made to rotate through 120° so that the operating portion 10 is exposed as shown in FIG. 5. The right side face of the VTR shown in FIG. 1 is provided with projections 14a, 14b and 14c in addition to operating keyboards 13a, 13b and 13c to be operated during photography. Accordingly, if the camera-integrated type VTR is placed on a flat surface with the right side face down, the projections 14a, 14b and 14c play the roles of feet and the camera-integrated type VTR can be stably laid there by support on three points.

Accordingly, if the camera-integrated type VTR is laid as shown in FIG. 5, it can be extremely stably laid by three-point support provided by the projections 14a, 14b and 14c. In addition, in the shown state, since the operating keys for reproduction are positioned on the apparatus with an inclination of approximately 60° as shown in FIG. 5, the operator can operate the apparatus as if he/she were operating an exclusive video deck for reproduction.

A tape cassette 15 is loaded in a predetermined position within the VTR casing 6 by a cassette holder 16. When the cassette holder 16 is popped up, the tape cassette 15 can be ejected from the apparatus. In the arrangement adopted in the present embodiment, since the optical-system accommodating part 1 and the EVF unit 4 are disposed on the top of the VTR casing 6, the cassette 15 is ejected downward from the VTR casing 6. According to such an arrangement, although the optical-system accommodating part 1 is disposed on the top of the VTR casing 6, the cassette 15 can be inserted or ejected without the need to pop up the cassette holder 16 to a large extent. Accordingly, the aforesaid embodiment provides an arrangement which makes it possible to effectively reduce the thickness of the entire apparatus without increasing the size of the entire mechanism.

A cover 17 serves to cover an ejection portion for the cassette 15, and is arranged for turning motion about a support portion provided on the bottom of the VTR casing 6. During photography, the cover 17 is locked in the state shown in each of FIGS. 2 and 4 by a lock mechanism which is not shown. Although not illustrated, the loading of the cassette 15 is completed when the cover 17 is in the locked state. The lock of the cover 17 can be released by means of a lock release lever 18.

Hand-strap hooks 19 and 20 are provided at the opposite end portions of the cover 17, and a hand strap 21 is secured between the hand-strap hooks 19 and 20. During photography, the operator applies a lower portion of the palm to the locked cover 17 and inserts the hand through the space between the hand strap 21 and the cover 17 until the middle portion of the palm comes into contact with the remote controller 27. In this manner, the operator can firmly hold the entire camera-integrated type VTR. The size of each of the aforesaid elements is determined so that the operator can operate the zoom switch 7 by using the index finger and the middle finger.

A microphone 23 and a cover 24 for an input-output terminal assembly 57 are provided on the front face of the VTR casing 6 according to the present embodiment, while a battery 25 is attached to the rear face of the same, whereby all faces of the VTR casing 6 are utilized extremely effectively.

As described above, according to the present embodiment, since the photographic optical system and the electronic viewfinder are disposed above the recorder casing for recording a signal obtained by photography, the thickness of the entire video camera is reduced to a remarkable extent and hence the compactness is improved. Since the electronic viewfinder is disposed on the top of the video camera, the user can hold the VTR casing with ease. In addition, since the optical axis of the electronic viewfinder and that of the photographic optical system are positioned close to each other, it is possible to reduce parallax during photography.

Since the photographic optical system is disposed above the recorder casing and a recording medium is ejected downward from the recorder casing, the thickness of the entire video camera can be reduced to a remarkable extent because a holding mechanism for the recording medium can be simplified.

An operating part for actuating a mechanism for varying the magnification of the photographic optical system is disposed at the rear of the photographic optical system disposed above the recorder casing, and a grip is disposed on one side of the recorder casing. Accordingly, since space on the top of the recorder casing is utilized extremely effectively, an arrangement favorable for making this kind of video camera compact can be achieved.

Figure 6:
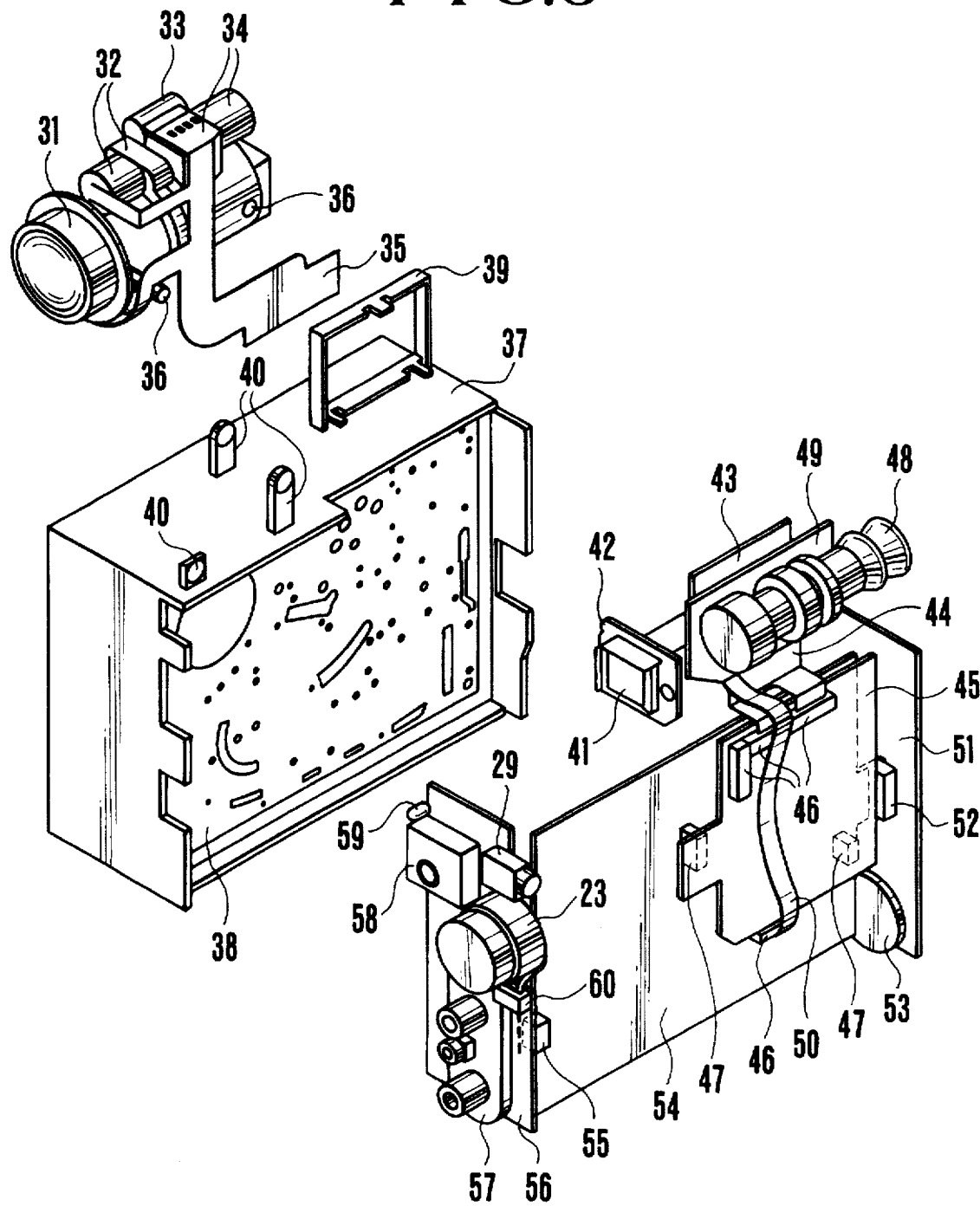
FIG. 6 is an exploded, perspective view diagrammatically showing the internal structure of the embodiment of the present invention.
Figure 7:
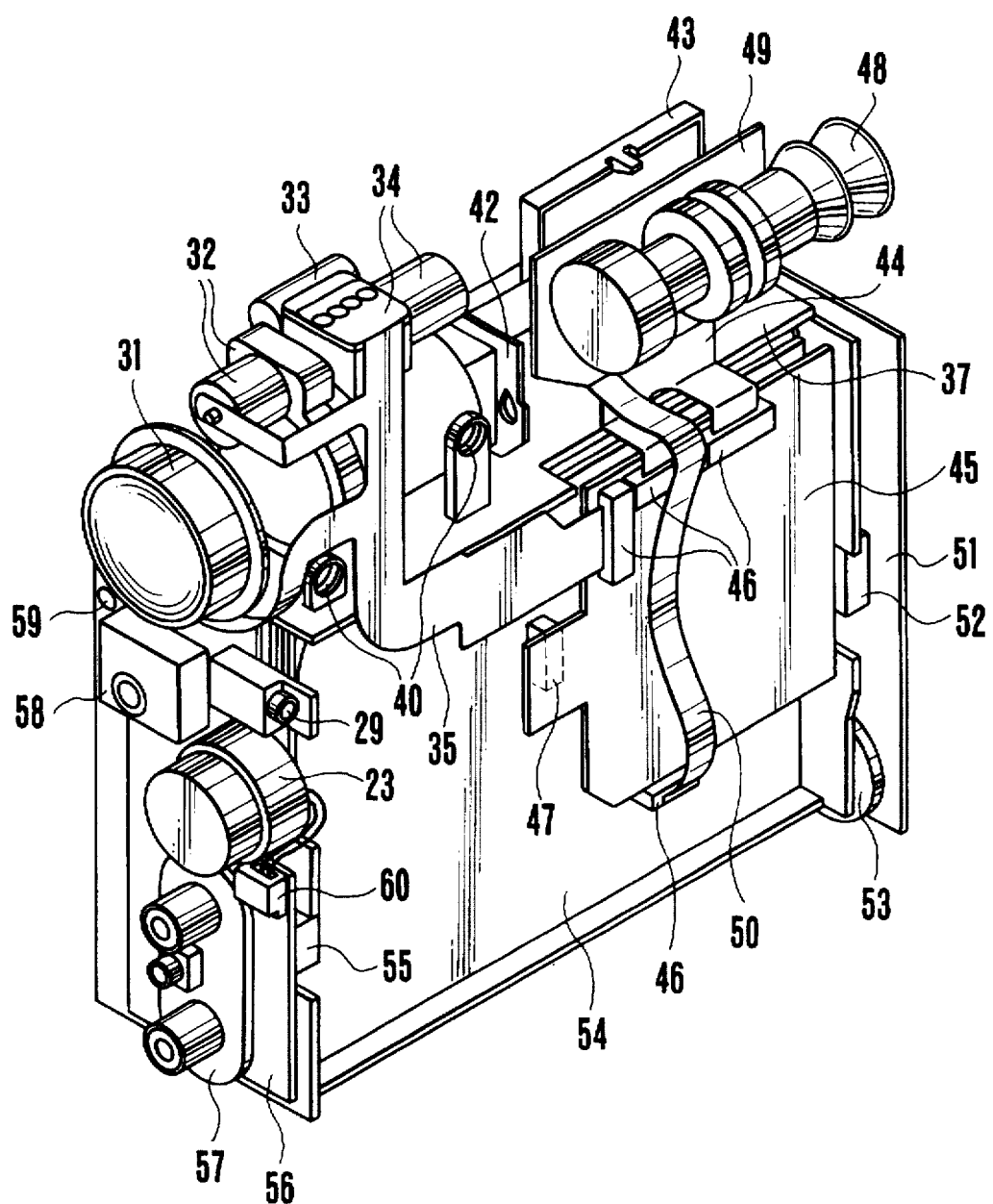
FIG. 7 is a perspective view diagrammatically showing the assembled state of the units shown in FIG. 6.

FIG. 6 is an exploded, perspective view diagrammatically showing the internal structure of the embodiment of the present invention, and FIG. 7 is a perspective view diagrammatically showing the assembled state of the units shown in FIG. 6.

A photographic optical system 31 includes actuators such as an IG meter 32, a power zooming motor 33 and a focusing motor 34. The photographic optical system 31 is fixedly held by holding portions 40 provided on a recorder holder 37, by the fixing of mounting portions 36 formed on the photographic optical system 31 to the respective holding portions 40 by means of screws. Since each of the actuators incessantly operates during photography, it is preferable to adopt a layout which can minimize the level of operating noise generated from the actuators and picked up by a microphone 23. For this reason, in the present embodiment, since the actuators are disposed on the top of the photographic optical system 31, the distance between the microphone 23 and each of the actuators is made large so that the microphone 23 is prevented from easily picking up the operating noise. From the viewpoint of design, it is preferable to lower the position of the optical axis of the photographic optical system, since the entire apparatus can be made apparently small and stable even if the external size is the same. For this reason, in the present embodiment, the actuators are disposed above the photographic optical system 31, and the photographic optical system 31 and a recorder mechanism part 38 are disposed close to each other.

An infrared-light receiving unit 58 and a tally LED 59 are disposed on the front face of the apparatus. Accordingly, if a photographer is to photograph himself/herself by using the remote controller 27, infrared light emitted from the remote controller 27 can be directly received at the same time that a lens opening portion is aimed at the photographer, and the photographer can confirm whether the infrared light has been received, through the tally LED 59. In addition, as shown in FIG. 5, an arrangement is adopted in which the infrared light emitted from the infrared-light emitting part 11 of the remote controller 27 can be received by the infrared-light receiving part 12 (the infrared-light receiving unit 58 shown in FIG. 7) even during the operation of the VTR through the remote controller 27. Accordingly, it is possible to achieve a compact and reasonable layout which can provide improved operability.

A first circuit board 51 has a power supply circuit which is not shown. A second circuit board 54 has a servo system control circuit and an audio/video signal processing circuit, neither of which is shown. A third circuit board 56 has the audio/video input-output terminal assembly 57, the infrared-light receiving unit 58, the tally LED 59, and a microphone amplifier circuit which is not shown. Electrical circuits for the VTR part are formed on the three circuit boards 51, 54 and 56, and the circuit boards 51, 54 and 56 are disposed so as to cover three sides of the recorder mechanism part 38, respectively. In this arrangement, the electrical connection between the circuit boards 51 and 54 and that between the circuit boards 54 and 56 can be achieved, respectively, by circuit board connectors 52 and 55 each of which has small size, light weight and low cost and which can be easily assembled. Accordingly, since it is not necessary to use a wiring material which would have conventionally been needed, it is possible to effectively reduce the size, weight and cost of the apparatus and it is also possible to improve reliability. In addition, all faces of the VTR part can be effectively utilized in determining the arrangement of various constituent elements such as operating keyboards.

Since the audio/video input-output terminal assembly 57 is disposed on the front face of the apparatus, AV cables 28 can be easily connected to the audio/video input-output terminal assembly 57 whether the camera-integrated type VTR is laid vertically or horizontally as shown in FIG. 5.

The microphone 23 is connected to a connector 60 on the third circuit board 56, and a microphone jack 29 is also disposed on the third circuit board 56. Since elements associated with the microphone amplifier circuit are disposed close to each other in this manner, the circuit is not susceptible to electrical noise and easy connection can be achieved. Accordingly, this arrangement contributes to an improvement in performance and reliability.

Since the first circuit board 51 is disposed on the rear side where the battery 25 is attached, the distance between the battery 25 and the power supply circuit is reduced to realize efficient supply of electrical power. If a lithium battery is mounted on the first circuit board 51, it is possible to realize a backup power supply for a memory which serves the function "auto date" or "digital title" which is a feature of the apparatus. It is, therefore, possible to achieve the advantage of realizing a power supply system having a simplified construction and an improved efficiency.

An element 41 is a charge-coupled device (CCD), and the CCD 41 and a fourth circuit board 43 which will be described later are connected to each other by a flexible printed circuit board (FPC) 42. The fourth circuit board 43 has elements such as a clock, a sync generator and a sample-and-hold circuit which are associated with the CCD 41 in a video camera part. The fourth circuit board 43 and a fifth circuit board 45 which will be described later are connected to each other by an FPC 44. The fifth circuit board 45 has circuits such as a camera signal processing circuit, a microcomputer for automatic focusing (AF) and a circuit for "digital title". The above-described arrangement constitutes an electrical circuit for the video camera part.

Figure 8:
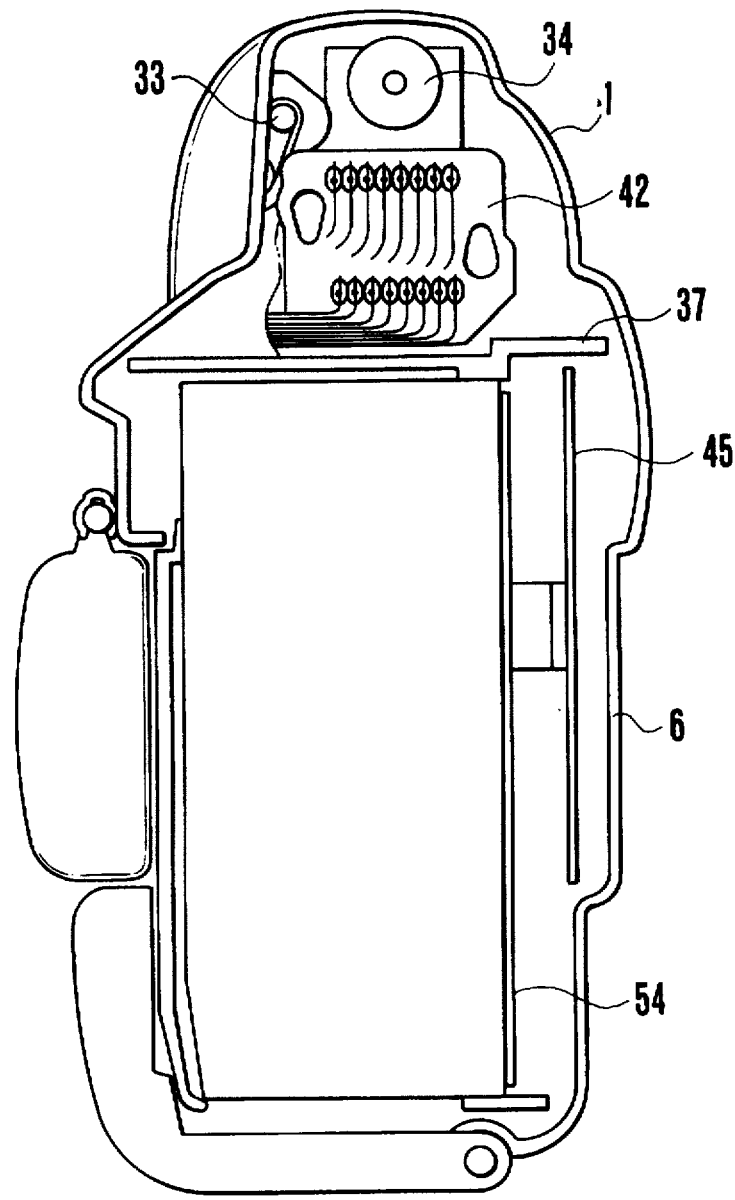
FIG. 8 is a cross-sectional view diagrammatically showing the structure of the camera-integrated type VTR according to the embodiment of the present invention.

In general, the CCD 41 has the disadvantage that the uniformity of image quality is impaired by dark current under high-temperature conditions. The dark current in the CCD 41 is a main cause of the deterioration of image quality. However, the current trend in the art is to develop a miniaturized camera-integrated type VTR in which circuit boards which generate heat are closely spaced from each other. In such a camera-integrated type VTR, the CCD 41 is easily heated due to a temperature rise which is caused by the close arrangement of the circuit boards. In the present embodiment, the distance between each of the circuit boards, which generate heat, accommodated in the casing 6 and the CCD 41 accommodated in the optical-system accommodating part 1 is made large, and as shown in FIG. 8, it is possible to isolate the CCD 41 from the heat of the circuit boards by utilizing as a shield a top plate of the recorder holder 37 which is an internal mechanical part. In actual measurement, it has been observed that a temperature rise on the CCD 41 can be suppressed by approximately 20° C. when compared to the conventional camera-integrated type VTR. Accordingly, the above-described arrangement greatly contributes to an improvement in image quality.

A multi-layer circuit board made of a ceramic material is used as the fourth circuit board 43 to reduce the size thereof. In a conventional example, since the mechanical strength of ceramics is comparatively low, a fixing method such as normal screwing is not adopted. Instead, after a metallic terminal has been fixed to a ceramic board by soldering, the ceramic board is fixed in position by screwing the metallic terminal. However, in the present embodiment, a holder 39 is made of an elastic material, and the fourth circuit board 43 is held by the elasticity of the holder 39. Accordingly, it is possible to reduce the size, weight and cost of the apparatus.

A CRT unit 48 mounted on an EVF circuit board 49 is accommodated in a case to constitute the EVF unit 4 (refer to FIG. 1). The EVF circuit board 49 and the fifth circuit board 45 in the casing 6 are connected to each other by an FPC 50 inserted through a turning shaft (not shown) of the EVF unit 4.

As described above, according to the present embodiment, since the photographic optical system is disposed between sound inputting means for inputting sound information and a driving part for controlling the position of a lens in the photographic optical system, it is possible to achieve a camera-integrated type VTR having a compact arrangement. Further, it is possible to prevent the operating noise of the driving part from being inputted into the sound inputting means. In addition, since the photographic optical system is disposed above the recorder mechanism part and the driving part is disposed above the photographic optical system, it is possible to reduce the thickness of the apparatus.

In addition, first sound inputting means for inputting sound information and connecting means to which second sound inputting means different from the first sound inputting means is to be connected are provided on one circuit board from among a plurality of circuit boards which are provided in surrounding relation to the recorder mechanism part. Accordingly, it is possible to achieve a compact arrangement which is not susceptible to electrical noise and contributes to an improvement in performance and reliability.

In addition, since a shielding part is provided for isolating an image sensor part from a plurality of circuit boards which are provided in surrounding relation to the recorder mechanism part, not only is it possible to achieve a compact arrangement but also it is possible to eliminate thermal influence on the image sensor part, thereby improving image quality.

What is claimed is:

1. A video camera comprising:
   an imaging optical system disposed above a recorder mechanism;
   an imaging element for converting an optical image obtained from said imaging optical system to an electric signal, and disposed above said recorder mechanism and arranged positionally behind said imaging optical system in the optical path of the light rays emerging from said imaging optical system; and an electronic viewfinder disposed above said recorder mechanism and arranged positionally directly behind said imaging optical system and said imaging element in the optical path of the light rays emerging from said imaging optical system in the state of photography.

2. A video camera according to claim 1, wherein a grip is disposed on one side of a casing and an operating part for driving a mechanism for varying a magnification of said imaging optical system is provided at the rear of said imaging optical system.

3. A video camera according to claim 1, wherein a casing is formed to eject downward a recording medium for recording the signal obtained by photography.

4. A video camera according to claim 1 wherein the imaging optical system is disposed above a casing of a recorder for recording a signal obtained by photography and said casing is formed to eject downward a recording medium for recording the signal obtained by photography.

5. A video camera according to claim 4, wherein a cover is movably attached to said casing, said cover being able to be locked in the state of covering a portion through which to eject the recording medium.

6. A video camera comprising:

a recorder mechanism part;

a plurality of circuit boards provided in surrounding relation to said recorder mechanism part and disposed in a different direction to said recorder mechanism part and to each other and provided with electrical circuits, respectively; and sound inputting means for inputting sound information;

said sound inputting means being provided on a face of one circuit board from among said plurality of circuit boards, said face of said one circuit board being reverse to a face of said one circuit board which is opposite to said recorder mechanism part.

7. A video camera according to claim 6, further comprising connecting means to which external sound inputting means different from the sound inputting means is to be connected, said sound inputting means and said connecting means being provided on the same face of the circuit board.

8. A video camera comprising:

a recorder mechanism part;

a circuit board provided in surrounding relation to recorder mechanism part and provided with an electrical circuit;

an image sensor part being disposed above said recorder mechanism part; and a recorder holding part for holding said recorder mechanism part, a portion of said recorder holding part isolating said image sensor part from said circuit board with respect to thermal influence.

9. A video camera according to claim 8, wherein said image sensor part is a CCD.

* * * * *